3,468,814
SELF-PROPELLED AEROSOL COMPOSITION AND METHOD OF USING SAME TO COAT PLATES USEFUL IN THIN-LAYER CHROMATOGRAPHY
Paul D. Dernier, Murray Hill, and Henry Frankel, Raritan, N.J., assignors to Allied Chemical Corporation, New York, N.Y., a corporation of New York
No Drawing. Filed Feb. 21, 1966, Ser. No. 528,802
Int. Cl. B01d *15/08;* B01j *1/00;* C09d *5/00*
U.S. Cl. 252—408                                18 Claims

ABSTRACT OF THE DISCLOSURE

This application discloses aerosol compositions for use in preparing thin-layer chromatography plates. The compositions broadly comprise an adsorbent, a dispersion medium, and a propellant. The adsorbent used is silica gel, which is present in the range from about 10% to about 30% by weight. The dispersion medium used preferably comprises a mixture of about equal proportions of low polar and high polar solvents and is present in the compositions in the amount of from about 30% to about 60% by weight. A liquefied gaseous propellant is used and is present in the amount from about 25% to about 55% by weight. An example of a preferred aerosol composition is 20% by weight silica gel adsorbent, 40% by weight of a mixture of equal parts of toluene and ethyl acetate as a dispersion medium and 40% by weight dichlorodifluoromethane as a propellant.

---

This invention deals broadly with thin-layer chromatography, and more specifically with the preparation of plates suitable for use in thin-layer chromatography. In particular this invention deals with a new method of preparing thin-layer chromatographic plates by aerosol spraying and with new aerosol compositions useful with said method.

The term chromatography as used herein refers to an analytical technique for separation of the components of certain mixtures of organic substances (for example, hydrolysates, mixed alkaloids, etc.), by means of passing the mixture through a selective adsorption medium, which allows some components to pass through more readily than others according to the degree of adsorption. Thin-layer chromatography is adsorption chromatography performed on an open thin layer of an adsorbent material (usually silica gel) which is supported by a backing plate of glass or a similar material. Thin-layer chromatography is particularly useful for analyzing small amounts of heat sensitive mixtures, since the amount of mixture is often too small to analyze by other chromatography techniques and the heat sensitivity precludes separation by such means as fractional distillation.

In use of the plate, solutions of the mixture samples to be analyzed are spotted in a horizontal line on the adsorbent-coated surface of the plate using a micropipette. After drying, the plate is placed vertically in a small closed chamber, the atmosphere of which is sautrated with a solvent suitable for the material being analyzed, with the bottom edge of the plate immersed in a small trough of the same solvent. As the solvent front creeps up the adsorptive surface of the plate and past the sample spots, it carries the components of the samples various distances, each distance bearing a specific relationship to the composition of that particular component. The action is stopped by removing the plate from the chamber before the front reaches the top of the plate, and the height of each component can then be ascertained after "development" by heat, or by an appropriate agent such as iodine vapor, acid, alkali, dye, etc. The purpose of the "development" is to render the path of each component more clearly visible. By determining the ratio of the height reached by each component to the height of the solvent front, and comparison with reference tables, the analysis of the composition is obtained.

Thin-layer chromatography thus requires the preparation of chromatographic plates by applying a thin layer of adsorbent material to a glass or similar type of plate. In order to produce accurate separation results, the film must be applied to each plate with fairly uniform thickness (although some variance in the thickness from plate to plate is permissible), i.e., with a minimum of bubbles, ripples, etc.

There are in the prior art three principal types of plates for thin-layer chromatography.

The first type is a self-made silica-coated glass plate which can be prepared in the laboratory when needed by mixing silica gel with a solvent and applying the resultant slurry to a clean plate by means of a special spreader. This type of plate has the advantage that the user can, in preparing the plates, vary the coating thickness and technique from plate to plate. However, it has the disadvantage that the setting up of equipment, mixing of the coating, and subsequent cleaning of equipment are time consuming. Furthermore, there is almost always some of the expensive coating material left in the spreader reservoir which must be used or disposed of promptly before it solidifies, and thus it is often wasted. Another disadvantage of self-made plates is their relatively long drying period of 30–45 minutes, since water is generally used with the adsorbent material to form the slurry.

The second principal type of chromatographic plate is a commercially prepared silica-coated glass plate made in a manner similar to that described in the previous paragraph. This type of plate has the advantage that it can be purchased in a variety of sizes and requires no further treatment before use. Commercially prepared plates are, however, relatively costly and are subject to damage in shipment.

The third prior art type of chromatographic plate is a commercially prepared precoated synthetic sheet, such as poly(ethylene terephthalate) coated with silica, which requires no further treatment before use other than cutting to the desired size. However, the very thin layer which is characteristic of this type of plate (100 microns vs. the 250 micron conventional plate) limits the size of the sample which can be used therewith and thus restricts the use of this type of plate to mixtures requiring no more than 5 microliters of sample (as compared with the 250 microliter sample size which can be used with a 250 micron thickness plate). This sample size restriction limits the use of these very thinly coated plates with multicomponent systems, which often require a larger sample. Furthermore, cost of such coated synthetic sheets is quite high.

Due to the disadvantages of the above-mentioned types of chromatographic plates, there is a need in the art for a fast and inexpensive means of preparing thin-layer chromatographic plates of uniform quality in the laboratory.

Toward this end, a modification of the method of preparing the first-mentioned prior art type of plate (i.e. the self-made silica coated glass plate coated by using a spreader) has been tried by others. In this modification an aspirator bottle with an attached, self-contained pressure source has been used to spray the coating slurry on the plates instead of using a spreader. This method has, however, yielded poor results and in addition retains some of the disadvantages of the spreader method. A high pressure is required to aspirate the slurry from the bottle and such a high pressure is inconsistent with the application of a uniform coating, because of the exit blast which it creates. Furthermore, there is the disadvantage that the slurry must be mixed before use and disposed of thereafter, since it cannot be kept in the aspirator bottle; also the aspirator bottle must be thoroughly cleaned after each use and the surplus slurry disposed of.

It has now been found that a coating slurry for chromatographic plates can be formulated as a self-propelled aerosol composition and applied by spraying from an aerosol bomb containing in one unitary assembly all the components of the system.

Aerosol spray application of thin layers for chromatographic plates has the advantage that coating can be done rapidly and requires little or no costly setup and clean up time. Furthermore, the aerosol coating slurry requires no additional treatment before use other than shaking, and can be stored in the aerosol container between uses and thus need not be disposed after one application but can be used until the aerosol is exhausted. Another advantage is that, due to the dispersion media used, plates coated by aerosol application dry in a short time (5–10 minutes for the preferred composition) compared to plates prepared by spreader or aspirator bottle. This method of preparing plates is thus quite convenient, rapid and relatively inexpensive, retaining the advantages of prior art sources while doing away with their disadvantages.

Broadly, the aerosol compositions of this invention comprise an adsorbent, a dispersion medium, and a propellant. The adsorbent used is powdered silica gel. The dispersion medium is preferably a mixture of low polar and high polar solvents. The propellant is a liquid under pressure which becomes a gas when exposed to room temperature and pressure. The various components of the composition will be described in more detail below.

The silica gel powder used as the adsorbent component of the system must be small enough so as to properly dispersed in the dispersion medium and so as not to clog the spray orifice. However, if the silica gel powder has too small a particle size, it will not function properly as a coating so as to perform a reasonably rapid separation of the components of the mixture. It has been found that silica gel powder having a particle size of three to four hundred mesh (about 50 to 37 microns) can be used. Adsorbosil S–2, a commercially obtainable silica gel powder preparation having an average particle size of 350 mesh, produced by Applied Science Laboratories, Inc., of State College, Pennsylvania, was used as the source of silica gel for the compositions of the examples set forth below. The percentage of the silica gel powder in the aerosol composition can vary from about 10 percent to about 30 percent by weight. Below 10 percent the aerosol composition does not contain enough silica for economical use. Above 30 percent the aerosol composition becomes too thick to be easily sprayable. The preferred proportion is about 15 to 25 percent.

The dispersion medium must suspend the powdered silica gel to such a degree as to require little agitation before spraying. It must dry fairly rapidly upon application to the plate so as to prevent rippling due to the gas stream from the aerosol. However, it must not dry too rapidly or else the silica gel will be deposited as a powder. The preferred dispersion medium is a mixture of about equal parts of a low polar organic solvent and a high polar organic solvent. Upon mixing with the silica gel powder such a dispersion medium produces a colloidal dispersion which tends to hold the powder in suspension over a long period of time and, when combined with the propellant in the aerosol container, requires little agitation before use. With respect to the above-mentioned preferred dispersion medium, the terminology "about equal parts" is meant to include a dispersion medium containing from about 40 to 60 percent low polar solvent and a corresponding 60 to 40 percent high polar solvent. Within this range an excellent dispersion of the silica gel powder is obtained. Outside this range the silica gel powder tends to settle out to an undersirable extent upon standing. In some cases a high polar solvent alone has produced satisfactory results, but the mixture described above is preferred. The dispersion medium should comprise from 30 to 60 percent by weight of the aerosol composition. When the preferred dispersion medium (i.e., a mixture of low polar and high polar solvents) is used, the preferred proportion of dispersion medium is about 35–55 percent.

Aromatic solvents and certain aliphatic petroleum distillates can be used as low polar solvents but the aromatic solvents are preferred. The aromatic solvents are those normally derived from the distillation of coal tar, but petroleum-derived aromatic solvents can also be used. The aromatic solvents which have been found to be particularly suitable are the methylated benzenes, with toluene and xylol being preferred. The aliphatic petroleum distillates which are suitable are those having a boiling range of about 200° to 350° F. The most suitable high polar solvents have been found to be alcohols, esters, and ketones. The particular alcohols, esters and ketones which have been found to be suitable are the saturated aliphatic monohydric alcohols having from 1 to 4 carbon atoms (for example, methanol, ethanol, isopropanol and butanol), alkylated ketones having from 2 to 4 carbon atoms (for example, acetone and methyl ethyl ketone), and alkylated acetates having 3 to 6 carbon atoms (for example, ethyl acetate and butyl acetate). When a high polar solvent alone is used, the above-mentioned alcohols are the preferred solvents.

The propellant to be used must be miscible with the dispersion medium, must not cause agglomeration of the dispersion even over extended time periods (i.e., up to a year or more), and must generate sufficient pressure upon spraying to force the dispersed silica out of the aerosol bomb and onto the plates but must not provide such force as to blast and ripple the applied coating. The useful range of pressures for propellants, before mixing with the dispersion medium and silica, is about 37 to 120 p.s.i.g.; after mixing, the pressure should be about 30 to 40 p.s.i.g. Ideally the propellant should be nonflammable and nontoxic to the used. It must be a gas at room temperature and pressure and must liquefy under greater pressures at room temperature. Chlorofluorinated saturated hydrocarbons having 1 to 2 carbon atoms can successfully be used as propellants. The chlorofluoromethanes have been found to be very suitable, particularly dichlorodifluoromethane (which is preferred), monochlorotrifluoromethane, and mixtures thereof. The proportion of propellant in the composition can very from about 25 to about 55%, with the preferred range being about 30–40% by weight.

The spray container used to dispense the dispersion medium containing the silica gel powder can be a conventional aerosol bomb. However, best results are achieved if the aerosol bomb used has a powder-dispensing type of valve rather than the liquid-dispensing type of valve generally found on aerosols. The silica gel tends to jam the latter type of valve slightly open after use, thus allowing slow escape of solvent and propellant and eventually rendering the aerosol container useless for coating. The aerosol containers used in testing the compositions of the examples were conventional 8 oz. side seam, ½ pound-tin-plate containers with positive action on-off valves having about a 0.030 inch exit orifice.

The following examples are aerosol compositions which were tested and found to provide satisfactory thin-layer chromatography plates when sprayed onto clean glass plates from the type of aerosol container described above (percents are by weight):

| Powdered Silica Gel, percent | Dispersion Medium | Propellant (dichlorodifluoromethane unless otherwise indicated), percent |
|---|---|---|
| 18.5 | 49.5% ethanol | 32.0 |
| 15.0 | 30.0% isopropanol | [1] 55.0 |
| 20.0 | 55.0% ethanol | 25.0 |
| 20.0 | 50.0% ethanol | 30.0 |
| 21.7 | 43.3% toluene (21.65%), ethyl acetate (21.65%) | 35.0 |
| 20.0 | 40.0% toluene (20%), ethyl acetate (20%) | [2] 40.0 |
| 20.0 | 40.0% toluene (20%), butyl acetate (20%) | 40.0 |
| 20.0 | 40.0% toluene (20%), ethyl acetate (20%) | 40.0 |
| 20.0 | 40.0% toluene (20%), ethyl acetate (10%), butyl acetate (10%) | 40.0 |
| 21.7 | 43.3% toluene (21.65%), butyl acetate (21.56%) | 35.0 |
| 20.0 | 40.0% toluene (20%), isopropanol (20%) | 40.0 |
| 20.0 | 40.0% aliphatic petroleum distillate (20%),[3] acetone (20%) | 40.0 |
| 20.0 | 40.0% toluene (1%), aliphatic petroleum distillate (19%),[4] acetone (20%) | 40.0 |
| 20.0 | 40.0% xylol (20%), methyl ethyl ketone (20%) | 40.0 |

[1] Diclorodifluoromethane 27.5%, trichloromonofluoromethane 27.5%.
[2] Dichlorodifluoromethane 20.0%, trichloromonofluoromethane 20.0%.
[3] The petroleum distillate has the following characteristics.—Initial boiling pt., 313° F.; 50% evaporation pt., 338° F.; Dry end pt., 380° F.
[4] The petroleum distillate and toluene mixture has the following characteristics.—Initial boiling pt., 198° F.; 50% evaporation pt., 203° F.; Dry end pt., 218° F.

The compositions of the examples were tested by placing a clean glass plate in a horizontal position and spraying it with slightly overlapping strokes from an aerosol bomb containing the composition held about 6–8 inches vertically above it. Each completed plate was first visually inspected for such coating defects as ripplying, bubbles, powderiness, and runniness. The plates which passed the visual examination test were then further tested by spotting with a standard, commercially available separation-testing dye solution. Such dye solutions contain a known number of components. (An example of such a solution is a triple dye mix marketed by Brinkman Instruments, Inc., of Westbury, N.Y.) The solution was spotted on the plate and separated into components by the previously outlined thin-layer chromatography separation and development technique. If a distinct separation of the proper number of components was evident on visual examination, the coating composition was successful. The toluene-ethyl acetate-butyl acetate dispersion medium was found to yield the preferred composition.

It is estimated that under normal use at least 15 full size (20 x 20 cm.) chromatographic plates could be sprayed from a single can if a 16 oz. aerosol can were used. However, half or quarter size plates are easier to coat evenly.

Stability test were run on aerosol cans of the preferred formulation. Some of the cans were put in an oven at 110° F. to simulate the most adverse storage conditions. Other cans were left at room temperature. The cans were tested at about 2-month intervals by shaking and then spraying. No adverse effects such as agglomeration in the can or poor plate coating were noted, and the can still functioned well and produced good coatings after 6 months of such tests, even under the high temperature, which test is equivalent to a much longer time at room temperatures.

While this invention has been described with particular reference to specific embodiments, it is to be understood that it is not to be limited thereto but is to be construed broadly and restricted solely by the scope of the appended claims.

We claim:

1. The method of coating plates for use in thin-layer chromatography comprising spraying said plates from an aerosol bomb consisting of a unitary container containing a self-propelled composition comprising: from about 10% to about 30% by weight of powdered silica gel ranging in size from about 37 to about 50 microns, from about 30% to about 60% by weight of a volatile liquid dispersion medium for said powder and from about 25% to about 55% by weight of a liquefied gaseous propellant.

2. The method of claim 1 wherein said powdered silica gel comprises from about 15 to about 25%, said dispersion medium comprises from about 35 to about 55% and said propellant comprises from about 30 to about 40% by weight of said composition.

3. The method of claim 1 wherein said dispersion medium is a saturated aliphatic monohydric alcohol having from 1 to 4 carbon atoms and said liquefied gaseous propellant is a chlorofluorinated saturated hydrocarbon having from 1 to 2 carbon atoms.

4. The method of claim 1 wherein said dispersion medium comprises a mixture of low polar and high polar solvents.

5. The method of claim 4 wherein said mixture comprises between 40 to 60% by weight of low polar solvent and between 60 to 40% by weight of high polar solvent.

6. The method of claim 5 wherein said low polar solvent is selected from the group consisting of aliphatic petroleum distillates having a boiling range between about 200° and 380° F., alkylated benzenes and mixtures thereof, said high polar solvent is selected from the group consisting of saturated aliphatic monohydric alcohols having from 1 to 4 carbon atoms, alkylated ketones having from 3 to 4 carbon atoms, alkylated acetates having from 3 to 6 carbon atoms and mixtures thereof and said liquefied gaseous propellant is a chlorofluorinated saturated hydrocarbon having from 1 to 2 carbon atoms.

7. The method of claim 6 wherein said low polar solvent is an aliphatic petroleum distillate having a boiling range between about 200° and 380° F. and the high polar solvent is acetone.

8. The method of claim 6 wherein said low polar solvent is toluene and said high polar solvent is isopropanol.

9. The method of claim 6 wherein said low polar solvent is toluene and said high polar solvent is selected from the group consisting of ethyl acetate, butyl acetate and mixtures thereof.

10. The method of claim 6 wherein said low polar solvent is xylene and said high polar solvent is methyl ethyl ketone.

11. A self-propelled aerosol composition for coating plates for use in thin-layer chromatography, said composition consisting essentially of:
(a) from about 10% to about 30% by weight of powdered silica gel ranging in size from about 37 microns to about 50 microns,
(b) from about 30% to about 60% by weight of a dispersion medium selected from the group consisting or (1) mixtures of low polar and high polar solvents, said low polar solvents being selected from the group consisting of aliphatic petroleum distillates having a boiling range between about 200° and 380° F., alkylated benzenes and mixtures thereof and said high polar solvent being selected from the group consisting of saturated aliphatic monohydric alcohols having from 1 to 4 carbon atoms, alkylated ketones having from 3 to 4 carbon atoms, alkylated acetates having from 3 to 6 carbon atoms and mixtures thereof and (2) high polar solvents consisting essentially of saturated aliphatic monohydric alcohols having from 1 to 4 carbon atoms, and
(c) from about 25% to about 55% by weight of a liquefied gaseous propellant.

12. The composition of claim 11 wherein said dispersion medium is a mixture of low polar and high polar solvents, said mixture comprising between 40 to 60% by weight low polar solvent and 60 to 40% by weight of high polar solvent.

13. The composition of claim 11 wherein said dispersion medium is a high polar solvent consiting essentially of a saturated aliphatic monohydric alcohol having from 1 to 4 carbon atoms.

14. The composition of claim 12 wherein said low polar solvent is selected from the group consisting of aliphatic petroleum distillates having a boiling range between about 200° and 380° F., alkylated benzenes and mixtures thereof, said high polar solvent is selected from the group consisting of saturated aliphatic monohydric alcohols having from 1 to 4 carbon atoms, alkylated ketones having from 3 to 4 carbon atoms, alklated acetates having from 3 to 6 carbon atoms and mixtures thereof, and said liquefied gaseous propellant is a chlorofluorinated saturated hydrocarbon having from 1 to 2 carbon atoms.

15. The composition of claim 14 wherein said low polar solvent is an aliphatic petroleum distillate having a boiling range between about 200° and 380° F. and said high polar solvent is acetone.

16. The composition of claim 14 wherein said low polar solvent is toluene and said high polar solvent is isopropanol.

17. The composition of claim 14 wherein said low polar solvent is toluene and said high polar solvent is selected from the group consisting of ethyl acetate, butyl acetate and mixtures thereof.

18. The composition of claim 14 wherein said low polar solvent is xylene and said high polar solvent is methyl ethyl ketone.

References Cited
UNITED STATES PATENTS

| | | | |
|---|---|---|---|
| 2,705,207 | 3/1955 | Stevens | 252—305 X |
| 2,731,436 | 1/1956 | Stetz et al. | 252—305 X |
| 3,124,505 | 3/1964 | Doyle et al. | 252—305 X |
| 3,161,460 | 12/1964 | Huber | 252—305 X |

RICHARD D. LOVERING, Primary Examiner

U.S. Cl. X.R.

252—305; 210—31